April 18, 1950  J. A. McKENNA  2,504,439
BALL ALIGNER BEARING RACE FOR DISTRIBUTORS
Filed Feb. 7, 1949
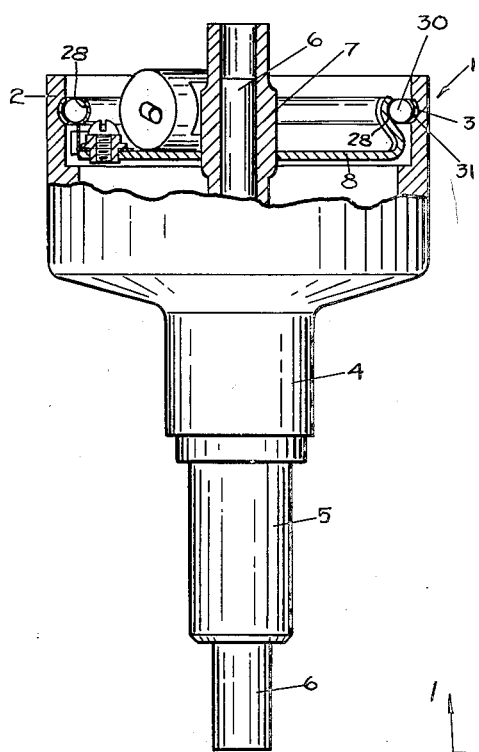
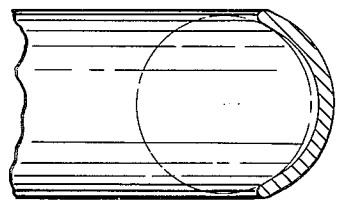
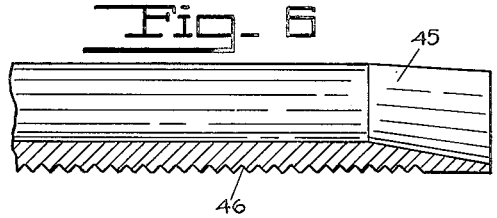
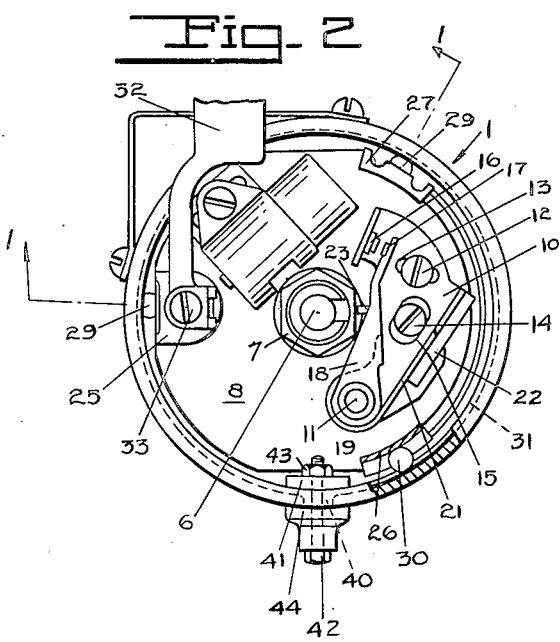
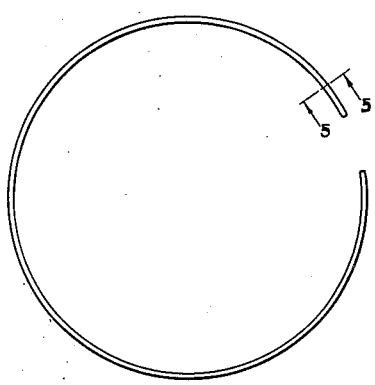
*INVENTOR.*
JAMES A. McKENNA
BY
*Boyken, Mohler + Beckley*
ATTORNEYS Patented Apr. 18, 1950

2,504,439

UNITED STATES PATENT OFFICE 2,504,439

BALL ALIGNER BEARING RACE FOR DISTRIBUTORS

James A. McKenna, San Francisco, Calif.

Application February 7, 1949, Serial No. 74,994

3 Claims. (Cl. 308—188)

This invention relates to a ball aligner race for distributors and has for one of its objects the provision of a ball aligner race so constructed as to facilitate assembly of the distributor, particularly the balls, when the aligner race is in position in the distributor.

Another object of the invention is the provision of a ball aligner race for a distributor that is so constructed as to resist shifting circumferentially thereof when it is positioned within the distributor.

Heretofore, it has been the practice to recondition worn distributors by providing a liner in the form of a ring having a concave radially inwardly facing side within an annular groove formed in the inner side of a cylindrical wall of the distributor housing.

The distributor has ball holders on a supporting plate within said cylindrical wall, and these holders hold the balls tightly against the liner or ball race. In order to position the balls between the holders and the race, one side of said cylindrical housing is formed with an opening that communicates with the groove. The ball race or liner is positioned within this groove with its opposite ends at opposite sides of said opening. The balls are inserted one at a time through said opening and into the holders as the latter are moved past the opening and over the ball race.

It is a simple matter to position the first ball between one of the holders and the ball race, since there is no material resistance to the ball rolling over the end of the liner. However, as soon as one ball is in position, the next ball will be in relatively tight engagement with the holder and the ring is almost always shifted circumferentially thereof by the ball when it attempts to roll over the end of the race. This tendency of the ring to shift becomes greater as more balls are inserted. The shifting of the race naturally causes the other end of the race to move over the hole in the housing so as to obstruct the same.

With the present invention, the above difficulty, which has been present and unsolved for the last eight or ten years at least in so far as I am aware, has been overcome, and the means for so overcoming said difficulty is one of the objects of this invention.

In the drawings, Fig. 1 is a side elevational view of a conventional distributor, with the cap removed and with the upper portion of the distributor in section as taken along lines 1—1 of Fig. 2.

Fig. 2 is a top plan view of the distributor shown in Fig. 1.

Fig. 3 is a top plan view of the ball aligning race separate from the distributor.

Fig. 4 is an edge view of the race of Fig. 3.

Fig. 5 is a greatly enlarged fragmentary sectional view taken along line 5—5 of Fig. 3.

Fig. 6 is a greatly enlarged fragmentary sectional view through one end of the race of Fig. 4, taken along a line extending circumferentially of said race and centrally thereof.

The distributor itself, generally designated 1, is of conventional structure in which the distributor housing comprises a cylindrical wall 2, having an annular, radially inwardly opening groove 3 formed in its inner side in a plane perpendicular to the central axis of said housing wall. Said groove 3 is curved in cross-sectional contour, and would normally provide the race for the balls later to be described. The liner of the present invention is adapted to fit in said groove when the latter becomes pitted or worn to an extent that the proper functioning of the distributor ceases.

While the distributor is conventional a clear understanding of the present invention requires a brief description of the same.

A reduced diameter cylindrical extension or projection 4 is integral with wall 2 and coaxial therewith, which projection is provided with a bearing 5 in which is rotatably supported a cam shaft 6 that in turn, projects into the space enclosed by the wall 2.

The outer open end of the housing is closed by a cap (not shown) and which cap carried terminals that are connected with the spark plugs of the engine that is associated with the distributor.

Shaft 6 has a cam 7 thereon, which cam has an extension axially of the shaft that supports the usual distributor arm thereon (not shown).

A plate 8 enclosed by wall 2 is centrally apertured for the cam, but is unsecured thereto. This plate has a member 10, one end of which is apertured for a pivot 11 that is carried by plate 8 and that extends through said aperture. This member is adjustable on plate 8 by means of a screw 12 that extends through a slot 13 in member 10, and an eccentric 14 carried by member 10 and extending into a slot 15 formed in said member.

The plate 10 has a contact 16 rigid therewith, and adjacent contact 16 is a movable contact 17 on an arm 18 that is pivoted at one end on pivot 11.

Contact 17 is urged at all times toward contact 16 by a spring 21 that engages a lug 22, that in turn, is secured to plate 10, but insulated therefrom. A cam follower 23 on arm 18 engages the cam 7 and makes and breaks the circuit through contacts 16, 17 as the cam is rotated.

On the plate 8 are three ball holders 25, 26, 27 of which two (26, 27) are rigid with said plate, while the third is relatively yieldable or resilient. These holders are substantially equally spaced around the periphery of the plate 8, and each projects perpendicularly from said plate toward the open end of the housing 1. A laterally outwardly opening groove 28 is formed in each holder in opposed spaced relation to the groove 3 in wall 2.

Ordinarily a steel ball is snugly positioned between each of the holders and groove 3, but when the groove has been worn and a liner is placed in said groove to provide a new race for the balls, then the balls 30 of proper size are positioned between the holders and a liner 31, the latter being in the present instance, the main feature of this invention. This liner will be described later on more in detail.

The plate 8 is oscillatable about the central axis by means of the usual link 32 for advancing and retarding the spark as desired in the operation of the engine, which link is connected with plate 8 by a pivot 33 that is carried by said plate adjacent its periphery. Upon disconnecting the link from the plate, the latter may be fully rotated through 360 degrees.

The resilient holder 25 functions to keep the balls 30 right against the liner or ball race, and it is relatively stiff, hence, when a liner is positioned within groove 3, it is a difficult job to place the balls between the holders and the liner. Heretofore, some makers have formed vertical or transverse grooves in the liner communicating with the circumferential recess or channel side of the race in an attempt to position the balls between the liner and the groove in the housing, but this has been generally abandoned and instead, the housing wall 2 has been formed with an opening, such as indicated at 40 (Fig. 2) between the ends of the liner when the latter is sprung into the groove, such as groove 3. The balls are then inserted through this opening to a position where the holders (upon moving them past the opening) will carry the balls onto the liner. This has proven to be quite difficult to do successfully in most instances, because the balls cause circumferential shifting of the liner or ring 31 when they engage the end edge of the liner, instead of freely rolling over said end edge.

After the balls are in position between the holders and the liner, the link 32 may be connected to pivot 33 and a clamp element 41 tightly clamped against the adjacent spaced ends of the liner 31 (Fig. 2). A bolt 42 may extend through opening 40 for holding element 41 in position, said bolt having a nut 43 thereon, that engages a block 44, the latter being outside the housing.

With my invention one or both ends of liner 31 are beveled on their inner sides at said end or ends, as indicated at 45 in Fig. 6. By so beveling the end, each ball may roll gradually onto the race or liner without causing any shifting of the latter. To further insure against circumferential shifting of the liner, the outer convex side may be roughened or milled, as at 46 (Figs. 4, 6), thus providing a friction surface in engagement with the annular groove in the housing wall 2.

It is usual, as seen in Fig. 5, to make the concavely extending arc on the inner side of the liner with slightly lesser radius than that of the ball, so the latter will be certain to be aligned on the liner between the parallel edges thereof.

In operation, the liner is sprung into the groove 3 after plate 8 is removed, and then the balls are inserted upon replacement of the plate and before securement of said plate to link 32.

The clamp 41 is out of the range of oscillation of the balls and ball holders, and tends to hold the liner against shifting circumferentially thereof.

I claim:

1. A ball aligner bearing for the balls in a distributor comprising a transversely split ring formed with a concave radially inwardly facing side in direction transversely of said ring for providing a race for said balls, one end portion of said ring being gradually tapered outwardly longitudinally of said ring in direction away from said convex side and to the terminating end edge of said ring on said end portion to facilitate insertion of the balls in said distributor and over said one end of said ring when the latter is positioned within said distributor.

2. A ball aligner bearing for the balls in a distributor comprising a transversely split ring formed with a concave radially inwardly facing side in direction transversely of said ring for providing a race for said balls, one end portion of said ring being gradually tapered outwardly longitudinally of said ring in direction away from said convex side and to the terminating end edge of said ring on said end portion to facilitate insertion of the balls in said distributor and over said one end of said ring when the latter is positioned within said distributor, the radially outwardly facing side of said ring being adapted to engage the surface of a radially inwardly facing groove in said distributor, and said radially outwardly facing side being roughened to provide a friction surface adapted to engage said surface of said groove.

3. In a distributor for an internal combustion engine including a housing having a cylindrical wall and a circuit breaker supporting plate mounted therein provided with ball holders having circumferentially disposed balls therein arranged in a common plane, said cylindrical wall having a groove on the inner surface thereof arcuate in cross-section and symmetrically disposed with respect to the common medial plane of the balls and concentric with said balls, a metal liner in the form of a ring having an arcuate roughened outer surface substantially adapted to fit the arcuate surface of said groove, said liner being of resilient material and sprung into said groove with its opposite ends spaced apart for passing the balls between said ends to said holders, an opening formed in said wall between said opposite ends for so passing said balls to said holders and between the latter and said concave inner side of said ring, one of the ends of said ring at said opening being gradually tapered from the outer side of said ring at said one end to said convex side to facilitate movement of the balls to between said holders and rings without causing accidental movement of said ring circumferentially thereof.

JAMES A. McKENNA.

No references cited.